US009019076B2

(12) United States Patent
Eckerdt

(10) Patent No.: US 9,019,076 B2
(45) Date of Patent: Apr. 28, 2015

(54) SECURITY SYSTEM FOR CONTAINERS

(71) Applicant: George H. Eckerdt, Victor, NY (US)

(72) Inventor: George H. Eckerdt, Victor, NY (US)

(73) Assignee: Key Systems, Inc., Fishers, NY (US)

( * ) Notice: Subject to any disclaimer, the term of this patent is extended or adjusted under 35 U.S.C. 154(b) by 0 days.

(21) Appl. No.: 14/149,417

(22) Filed: Jan. 7, 2014

(65) Prior Publication Data

US 2014/0118110 A1 May 1, 2014

Related U.S. Application Data

(63) Continuation of application No. 13/090,396, filed on Apr. 20, 2011, now Pat. No. 8,624,705.

(51) Int. Cl.
G05B 19/00 (2006.01)
H04Q 5/22 (2006.01)
G08B 13/14 (2006.01)
G08B 21/00 (2006.01)
G01G 23/38 (2006.01)
G06F 17/40 (2006.01)
G05B 1/01 (2006.01)
F17C 5/06 (2006.01)
G06Q 10/08 (2012.01)

(52) U.S. Cl.
CPC .............. *G05B 1/01* (2013.01); *G06Q 10/087* (2013.01); *F17C 5/06* (2013.01); *F17C 2221/01* (2013.01); *F17C 2223/0123* (2013.01); *F17C 2223/035* (2013.01); *F17C 2225/0123* (2013.01); *F17C 2225/035* (2013.01); *F17C 2250/032* (2013.01); *F17C 2250/0421* (2013.01); *F17C 2260/028* (2013.01); *F17C 2270/07* (2013.01)

(58) Field of Classification Search
CPC .............. G05B 1/01; F17C 2250/0421; F17C 2260/028; F17C 2270/07; F17C 5/06; G06Q 10/087; G01G 19/414; G01G 19/4144; G01G 19/42; G01G 15/00; G01G 19/24; G01G 23/362; G01G 23/3728; G01G 23/3735; G01G 9/00
See application file for complete search history.

(56) References Cited

U.S. PATENT DOCUMENTS

| 4,034,361 | A | * | 7/1977 | Mortensen | 340/613 |
| 4,827,643 | A | * | 5/1989 | Hearst et al. | 40/306 |
| 5,953,682 | A | * | 9/1999 | McCarrick et al. | 702/45 |
| 6,317,044 | B1 | * | 11/2001 | Maloney | 340/568.1 |
| 6,707,381 | B1 | * | 3/2004 | Maloney | 340/568.1 |
| 7,675,421 | B2 | * | 3/2010 | Higham | 340/572.1 |
| 7,813,973 | B2 | * | 10/2010 | Gudbjartsson | 705/28 |
| 2004/0032327 | A1 | * | 2/2004 | Flick | 340/568.1 |
| 2004/0095241 | A1 | * | 5/2004 | Maloney | 340/568.1 |
| 2007/0219753 | A1 | * | 9/2007 | Markwitz et al. | 702/187 |
| 2007/0222600 | A1 | * | 9/2007 | Reeves et al. | 340/572.4 |
| 2008/0157967 | A1 | * | 7/2008 | Jones et al. | 340/572.1 |

* cited by examiner

Primary Examiner — George Bugg
Assistant Examiner — Renee Dorsey

(57) ABSTRACT

A storage system for material containers provides a readable ID distinguishing each container, and includes a scale that weighs containers, so that the system can distinguish between containers that are sufficiently loaded to be effective and containers that are insufficiently loaded. The system preferably includes storage for containers held in contact with readers of the container IDs. This allows a controller to keep track of containers checked out for use and returned for storage, and to identify containers that have been discharged.

27 Claims, 4 Drawing Sheets

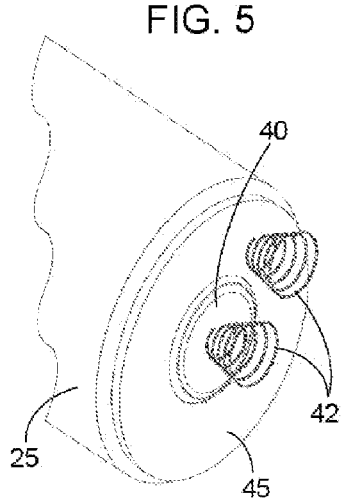
FIG. 6
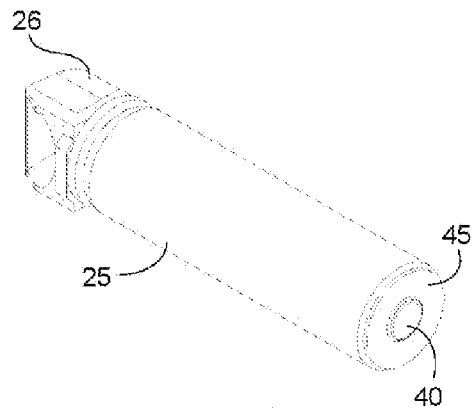
FIG. 3
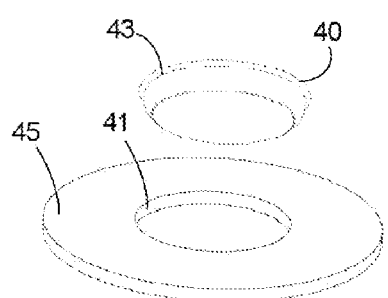
FIG. 4A
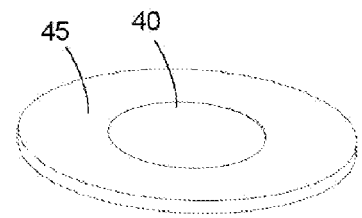
FIG. 4B
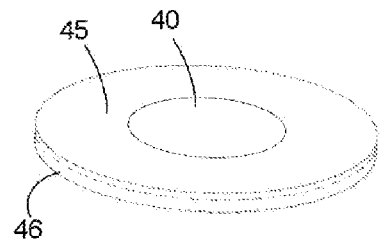
FIG. 4C
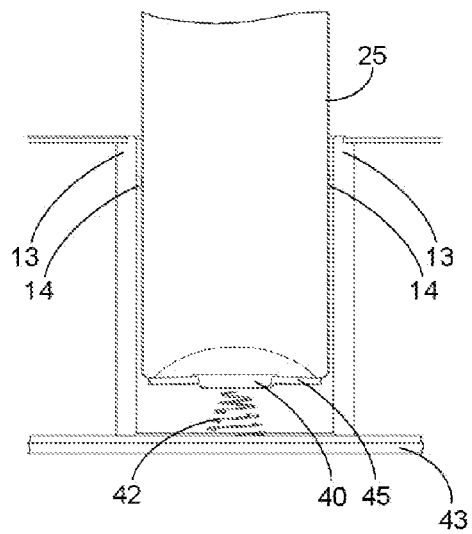
FIG. 5
FIG. 7

US 9,019,076 B2

SECURITY SYSTEM FOR CONTAINERS

TECHNICAL FIELD

Security systems to keep track of dispensing and return of containers

BACKGROUND

Containers of some materials are important enough to keep track of. The materials can be pepper spray, can be tear gas related, can be known by the chemical name OC (standing for oleoresin capsicum), and can be sold under the MACE trademark. Such materials are controlled substances and are used by police, jailers, and the military. They can be sprayed or squirted at an assailant to stop or limit an injury that might otherwise occur.

A convenient container for such materials is a pressurized spray can that can be deployed quickly. It may also be possible to package such materials in pumpable cans or bottles, and the outflow from containers of such materials can be formed as a squirt or spray.

In many situations, containers of OC materials need to be stored securely and checked out and checked back in at shift changes for workers such as police or jailers. Securing the dispensing and return of many containers of OC materials has presented an administrative burden that this invention aims to reduce.

SUMMARY

The invention provides a security system that dispenses and accepts the return of containers, keeps track of users of the containers, and ensures that containers to be reused hold a sufficient amount of material. Automating the dispensing and return of containers saves considerable labor in otherwise keeping track of a large number of containers and their users. Besides automation, the security system aims at low cost, and high reliability in providing data on authorized users, containers dispensed to authorized users, incidents of container usage, and return of containers to storage.

The inventive system also checks the weight of OC material in containers returned for storage. This can identify a weight loss discovered in a previously dispensed container and can require a report from an authorized user. It also allows the security system to distinguish between containers that are loaded with sufficient OC material to be effective, and containers that are insufficiently loaded to be reused. The readable identification for each container allows records to be automatically available on who checked out which container, how much that container weighed, and who is presenting that container back to storage and how much it weighs when presented.

DRAWINGS

FIG. 3 is a perspective view of a container provided with a preferred embodiment of an ID.

FIGS. 4A-C are enlarged and exploded views of the ID of FIG. 3 comprising a touch memory button and a mounting washer.

FIG. 5 is a conductive coiled spring usable in a reader for the ID of FIGS. 3 and 4.

FIG. 6 shows a container held in a storage socket where the touch memory button engages the reader spring of FIG. 5.

FIG. 7 is a fragmentary view of a preferred embodiment of a pair of reader springs engaging respectively the button and washer secured to a container.

Figure 8:
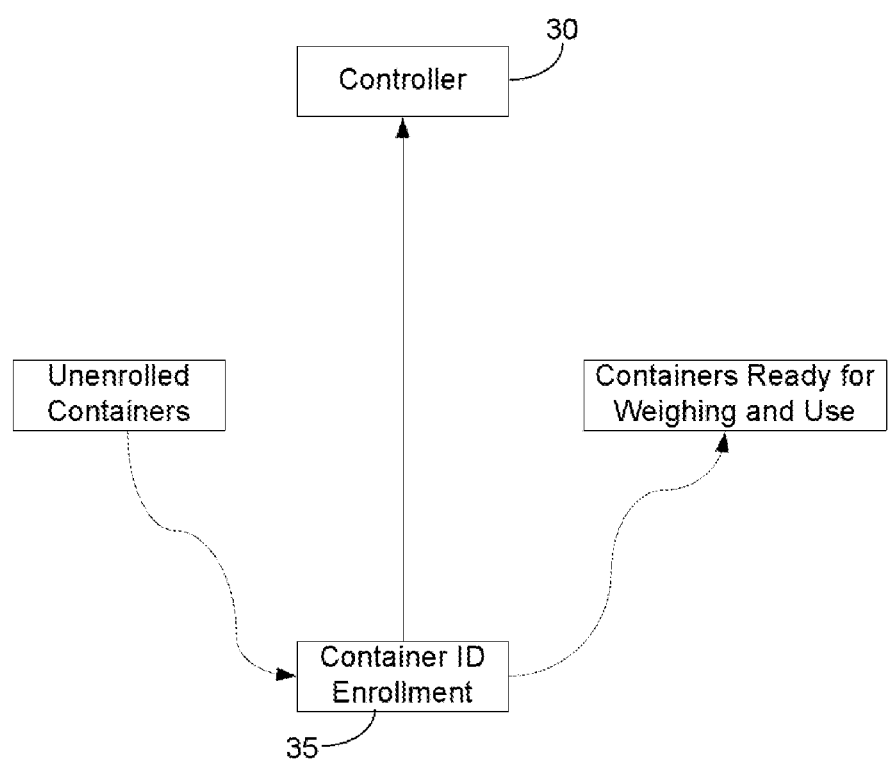

FIG. 8 is a schematic diagram of a container enrollment system informing a controller of the IDs of usable containers.

Figure 9:
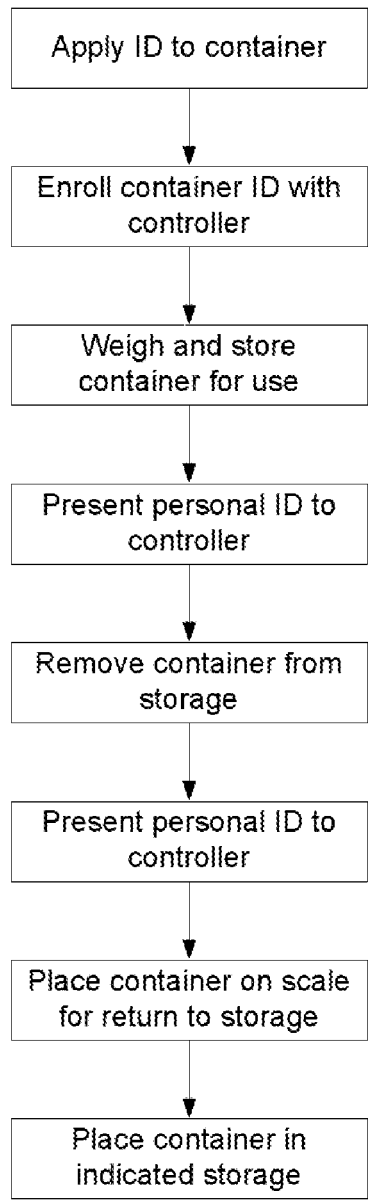

FIG. 9 is a schematic diagram of preferred steps in security procedures for use and storage of containers.

DETAILED DESCRIPTION

For security purposes, each container is given a machine readable ID by which each of the containers in a system can be distinguished. The ID can involve RFID, bar code, optical characters, or preferably a touch memory button such as a Dallas iButton. Other forms of ID are also possible.

In addition to a container ID, the security system preferably includes a scale that weighs containers to keep track of the weight of the contents of each container. Container weight can lessen by slow leakage, or by sudden discharge of some of the contents. Either occurrence can reduce weight below a minimum and is worth noting. The effective spray or squirt distance from a container depends mostly on how full the container is.

Keeping track of the weight of material in containers has several advantages. A container presented for return to storage with a weight less than it had when checked out can be an event that requires a report on where, when, and why the container was discharged. The weight of a container can also show that the container was not discharged since it was checked out, and the system can distinguish a reusable weight from a non-reusable weight. For example, a normal weight range can represent a sufficient weight of material remaining in a container for it to be effective in stopping an assailant. Conversely, a weight outside the normal range can show that a container is not effective for its intended purpose and should be withdrawn from circulation. The scale can also detect something substituted for a container if it weighs less than an empty container or more than a full container. By performing these functions, weight becomes part of a container ID system involving both the identity of the container and the weight of its contents by which the system can require retirement of containers that are no longer effective, and can accept as reusable containers presented by a known user with a sufficient weight to be effective.

The drawings show one preferred embodiment that combines elements of the inventive system in an expedient way. Many other combinations of elements are possible in other embodiments that may practice the principles of the invention.

Figure 1:
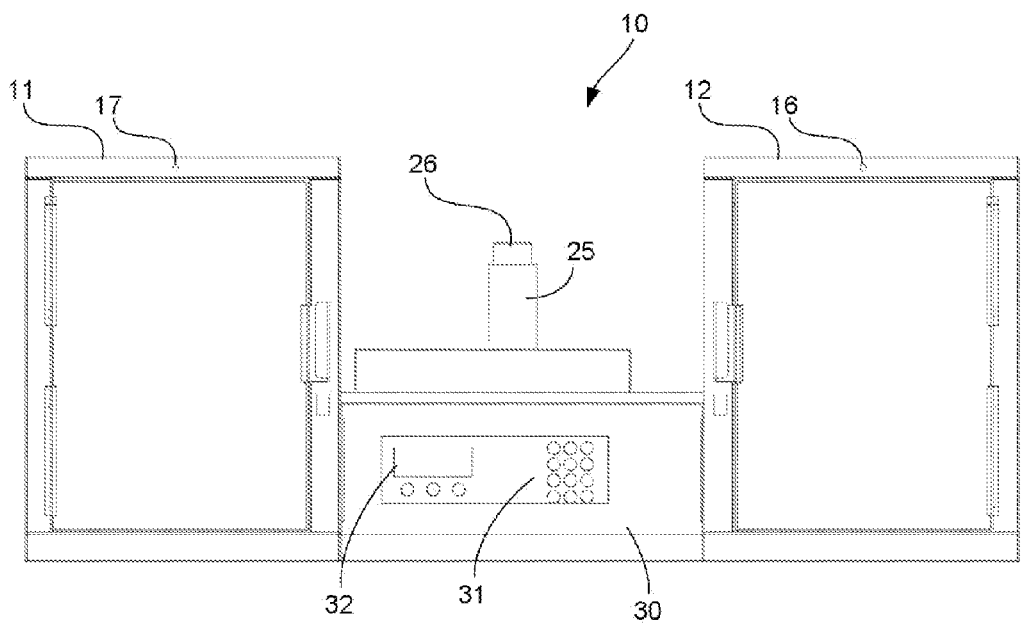
FIG. 1 is an elevational view of a preferred embodiment of the inventive system.

The embodiment 10 shown in FIG. 1 preferably includes a reusable storage 11 and a non-reusable storage 12. Conveniently near these is a scale 15 that can weigh a container 25. A controller 30 is also arranged conveniently near storage chambers 11 and 12. These are normally kept locked and are unlocked by control system 30 in response to an authorized user.

Container 25, as shown in FIG. 3, has an ID in the form of a touch memory button 40 that is preferably mounted in a washer 45 and permanently secured to container 25. The most convenient place for this is on the bottom of container 25 opposite dispensing end 26. Washer 45 is electrically conductive, and button 40 is preferably permanently mounted in washer 45, such as by being press fit into hole 41 in washer 45.

It may also be possible to mount button 40 in a recess in washer 45, and to facilitate bonding or attachment to container 25, washer 45 could have a skirt 46 such as shown in FIG. 4C. The combination of washer 45 and ID button 40 is preferably secured to the base of a container 25 and preferably affords a flat bottom to the container 25.

The touch memory button 40 in its preferred mount in washer 45 is machine readable by means of a pair of electrical contacts 42 that respectively engage button 40 and washer 45. Other forms of electrical contacts are possible.

Figure 2:
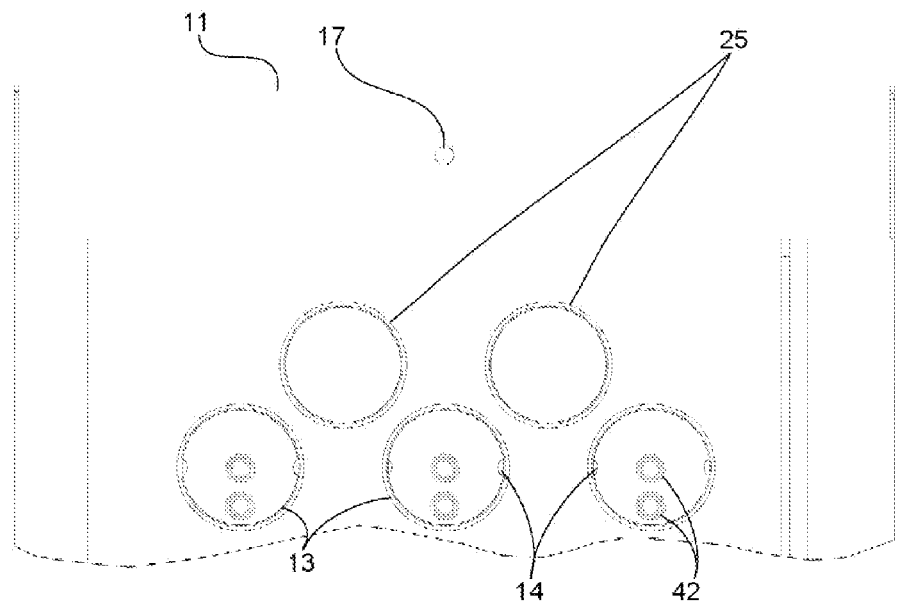
FIG. 2 is an elevational view of a storage portion of the system of FIG. 1 with the door removed to show container receptacles.

The places where the IDs of container 25 are read, including scale 15, and storage units 11 and 12, are preferably provided with sockets or cells 13 that contain reader contacts preferably in the form of conductive coil springs 42. [See FIGS. 2 and 6]. This allows one of the springs 42 to be centered on an axis of a container 25 lodged in a cell 13 to engage button 40, while a companion coil spring 42 is offset from the container axis to engage washer 45. The contacts engaging washers 45 are preferably in electrical contact with a neutral buss, which cooperates with the axially concentric contact spring 42 to make the IDs of buttons 40 readable.

Container cells or sockets 13 preferably include frictional elements 14 that hold a container against slipping or sliding outward while positioned within a cell 13. This helps hold containers 25 in place with washers 45 and buttons 40 making contact with coiled springs 42 arranged on a reader board 43.

The functioning of the illustrated system is preferably programmed into controller 30 having a user interface 31. This can respond to authorized users who can optionally be identified by PIN, card swipe, proximity, or biometrics. Prompts can appear in display window 32 so that a user following the prompts can deal effectively with a fully automated system.

To prepare containers 25 for use, the ID of each container is preferably communicated to controller 30 by a container enrollment station 35, as shown in FIG. 8. This registers with controller 30 the IDs of all containers that may be called upon for use, and it allows controller 30 to accept as containers 25 only those who have their IDs enrolled beforehand. This can also produce a supply of containers ready for weighing and use.

Preferred steps in a security administration process for storing and using containers is schematically illustrated in FIG. 9. Many additional steps are possible to meet varying needs. These can include prompts appearing in controller display window 32.

When containers 25 are initially loaded into reusable storage 11, they have their touch memory buttons 40 in place, and they are weighed on scale 15, which can determine whether they are fully loaded. Containers 25 are then placed in sockets 13 of reusable storage 11 for dispensing to authorized users. Readers 42 arranged on reader boards 43 engage the touch memory buttons 40 and washers 45 of all the containers 25 that are placed in storage. This gives controller 30 the identities of whatever number of containers 25 are stored.

When an authorized user logs into controller 30, then controller 30 unlocks the door of reusable storage 11 and preferably illuminates a light 17 indicating the unlocked door so that the authorized user can operate the door handle to open the door and remove a container 25 for possible use. A withdrawn container 25 no longer has a memory button 40 contacting a machine reader 42, which enables controller 30 to detect the withdrawal of a container 25 and to note the ID of the withdrawn container. The authorized user then shuts the cabinet door and is equipped with a container 25. If the user withdraws more than one container the controller can set off an alarm or provide a notification by email, text messaging, or computer display, that something unusual has happened.

To return a container 25, the authorized user logs into controller 30 and presents a container 25 for return to storage by placing container 25 on scale 15. Controller 30 then notes the weight of container 25, and scale 15 preferably includes an ID reader so that controller 30 can also determine the id of the container presented for storage.

If the container has lost weight since it was checked out, controller 30 can provide a notification that a report is necessary on the circumstances of a discharge from a container in the possession of an authorized user. Otherwise, if container 25 has about the same weight as when it was checked out, controller 30 can unlock the reusable storage 11, which allows the authorized user to replace the container 25 in one of the sockets 13 in storage 11. Computer 30 then notes from the ID reader in storage 11 whether container 25 has been replaced into storage 11. If this has not occurred, controller 30 can sound an alarm or notify an administrator.

If a container 25 presented for storage has lost enough weight so that it is no longer effective, then controller 30 unlocks the door to non-reusable storage 12, which also is preferably provided with storage sockets 13 and ID readers 42. This illuminates light 16 so that the authorized user can then open the door and place container 25 in storage 12, which controller 30 can note. If the user does not place container 25 in storage 12, the controller can take appropriate action.

Controller 30 can also be programmed to deal with defective containers presented for non-reusable storage. A user option to controller 30 can report a defective container that for some reason does not work properly so that the defective container can be removed from circulation by being stored in non-reusable storage 12.

The specific functions of the security system can be varied considerably. They can be made more elaborate to include generation of reports, notification of events by email, web, text message, and cooperative exchange between several dispensing and return stations within a single facility.

An ID reader and a weigh scale for containers presented for storage can be separated, but for convenience, these are preferably combined near the storage containers. The system can be greatly enlarged without reducing its functions.

If security does not require it, non-reusable storage could become a discard bin where containers are no longer monitored. Problems that this might involve are prevented by deploying ID readers in non-reusable storage, as well as in reusable storage.

Use of other ID codes, such as RFID tags or bar codes, would change the way that the codes are read. Even with use of the preferred button IDs and washers, it is possible to use different electrical contact systems that contact the buttons 40 and the washers 45 to achieve ID reading. Buttons can be held in some conductive material other than a washer, for example, and edges of buttons 40 can provide neutral buss contact points. Changes in ID readers can vary security systems while following the desired principles and functions.

In addition to the OC materials mentioned in the background section, the invention can also be applied to containers of any materials worth protecting by a security system. The way that the controller 30 handles unlocking and locking of doors and opening of doors can be varied and automated in different ways.

What is claimed is:

1. A system controlling access to containers, and storage for the containers, the system comprising:
each of a plurality of containers having a readable ID;

a scale arranged to weigh containers presented for storage and including a first socket dimensioned to receive and support any of the plurality of containers presented for storage;
a reader arranged to read the IDs of containers presented for storage; and
a controller communicating with the readers and the scale and granting access to the storage if a container presented for storage has an ID known to the controller and sufficient weight to be reusable.

2. The system of claim 1, wherein the first socket includes at least one frictional element that engages a container when the container is inserted into the first socket.

3. The system of claim 1, wherein the reader includes at least one electrical contact mounted in the first socket to determine the ID of containers presented for storage.

4. The system of claim 3, wherein the readable ID is a touch memory button mounted in a conductive washer secured to each container.

5. The system of claim 4, wherein the at least one contact of the reader includes a conductive coiled spring contacting the touch memory button of a container inserted into the socket.

6. The system of claim 5, wherein the at least one contact of the reader further includes a second conductive coiled spring contacting the washer of the container inserted into the socket.

7. The system of claim 1, wherein the storage contains at least a second socket each including a respective reader, and each socket is dimensioned to receive a respective container and to orient the respective container to engage the respective reader.

8. The system of claim 1 including a container enroller communicating with the controller to register IDs of new containers.

9. A container control method comprising:
applying a readable ID to each container;
providing container storage having readers that read the ID of each container stored;
providing a reader of container IDs combined with a weigh scale to determine the weights and the IDs of containers presented for storage;
providing a controller communicating with the readers and with the scale and with authorized users;
determining with the controller an initial weight of each container presented for storage when the container is initially presented for storage;
arranging the controller to determine the IDs and users of containers removed from storage; and
arranging the controller to determine weights and IDs of containers presented for storage and to distinguish between reusable and non-reusable containers based on predetermined weight ranges for containers presented for storage.

10. The method of claim 9 including using a touch memory button to supply the ID for each container, mounting the touch memory button in a conductive washer, and securing the washer and the button to each container.

11. The method of claim 10, wherein the scale supports a socket dimensioned to receive a container presented for storage and the reader includes first and second contacts in the socket, the method further including inserting a container presented for storage into the socket and contacting the button and the washer with respective ones of the first and second contacts to read the button ID.

12. The method of claim 9 including dividing the storage into reusable and non-reusable portions to which the controller grants access based on the weight distinction.

13. The method of claim 9 including reading new container IDs with a container enroller that includes a respective reader, and communicating new container IDs to the controller.

14. A container comprising:
a touch memory button affording an ID;
the touch memory button is mounted on the container in electrical communication with contacts of the container on a portion of the container inserted into a socket of at least one of a weigh scale, a storage, and an enroller, and the contacts of the container engage corresponding contacts of a reader in the socket; and
the touch memory button is secured to the container so that the ID afforded by the touch memory button is permanently associated with the container.

15. The container of claim 14 wherein the button is mounted on the container via a conductive washer secured to the container and the conductive washer is one of the contacts of the container.

16. The container of claim 15, wherein the memory button includes another of the contacts of the container, an ID of the memory button is readable via the contacts of the reader mounted in the socket, and the contacts of the reader respectively engage the button and the washer.

17. The container of claim 16, wherein the contacts of the reader include a pair of conductive coiled springs.

18. A container controlling method usable in a container storage and dispensing system, the method comprising:
applying a readable ID to each container;
placing each container presented for storage on a weigh scale;
weighing each container presented for storage with the weigh scale;
reading the ID of each container presented for storage while the container is on the weigh scale;
arranging ID readers within the storage to identify the containers stored;
admitting authorized users access to storage to remove a container from storage;
noting the ID of any container removed from storage;
admitting to reusable storage any container presented by an authorized user if the container has a known ID and a weight within a predetermined range; and
admitting to non-reusable storage any container presented by an authorized user if the container has a known ID and a weight outside the predetermined range.

19. The method of claim 18 including forming the readable ID as a touch memory button applied to each container.

20. The method of claim 19 including using a pair of electrical contacts to communicate with the button to read the ID.

21. The method of claim 18 including noting a change of weight of a container presented for storage.

22. The method of claim 18 wherein arranging ID readers includes providing the storage with a plurality of receptacles each shaped to hold a container in a position engaging a reader mounted in the respective receptacle.

23. The method of claim 18 including using an enroller with a receptacle into which each new container to be used is inserted to read the ID of each new container, and enrolling with a controller in communication with the enroller the ID of each new container to be used before each container is weighed.

24. A system controlling storage and dispensing of spray containers, the system comprising:
a touch memory button mounted secured to each container to provide an ID for each container;

container storage divided into reusable storage and non-reusable storage, the reusable storage including a first lock and the non-reusable storage including a second lock;

container storage including readers of the IDs of stored containers;

a weigh scale including an ID reader to determine a weight and an ID of containers presented for storage;

a controller communicating with the readers, with the weigh scale and with authorized users;

the controller unlocking the first lock to grant access to reusable storage for a container presented by an authorized user if the container has a known ID and a weight within a predetermined range; and the controller unlocking the second lock to grant access to non-reusable storage for a container presented by an authorized user if the container has a known ID and a weight outside the predetermined range.

25. The system of claim 24 wherein the readers each comprise a pair of conductive electrical contacts, at least one of the electrical contacts respectively contacting the touch memory button.

26. The system of claim 24 wherein the storage comprises a plurality of receptacles each shaped to hold a container in a position engaging one of the readers.

27. The system of claim 24 further comprising an enroller including a respective reader, wherein the IDs of new containers are read with the enroller and communicated to the controller before the weigh step.

\* \* \* \* \*